UNITED STATES PATENT OFFICE.

HEINRICH RAEDER, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE OF ANTHRACENE SERIES.

950,343.   Specification of Letters Patent.   Patented Feb. 22, 1910.

No Drawing.   Application filed October 21, 1909.   Serial No. 523,803.

*To all whom it may concern:*

Be it known that I, HEINRICH RAEDER, doctor of philosophy, chemist, citizen of the German Empire, residing at Vohwinkel, near Elberfeld, Germany, have invented new and useful Improvements in Vat Dyes, of which the following is a specification.

My invention relates to the manufacture and production of new vat dyes of the anthracene series dyeing cotton from the hydrosulfite vat beautiful fast Bordeaux to violet shades. The process for their preparation consists in condensing para-aminoalkoxyanthraquinones with halogen substituted anthraquinones or by condensing para-halogen substituted alkoxyanthraquinones with aminoanthraquinones.

The new products are after being dried and pulverized colored powders practically insoluble in water and in the usual organic solvents and soluble in concentrated sulfuric acid with from a blue to green color. They yield on treatment with hydrosulfite and caustic soda lye vats suitable for dyeing cotton fast Bordeaux to violet shades.

In carrying out the new process practically I can proceed as follows, the parts being by weight:

Example: A mixture of 30 parts of 1.4-aminomethoxyanthraquinone, 30 parts beta-chloroanthraquinone, 4 parts of cuprous chlorid, 25 parts of anhydrous sodium acetate and 300 parts of naphthalene is heated to boiling for about 6 hours. The resulting dye is precipitated from the melt with naphtha. After cooling to 40 to 50° C. the dye is filtered off, washed with ligroin, glacial acetic acid, hydrochloric acid and water and dried. It is after being dried and pulverized a dark powder practically insoluble in water and in the usual organic solvents; it is soluble in concentrated sulfuric acid with a greenish-blue color. By treatment with reducing agents, *e. g.* hydrosulfite and NaOH a brown vat is obtained dyeing cotton beautiful Bordeaux shades.

Herewith the properties of some of the new products are given: 1.4-aminomethoxyanthraquinone+1-chloroanthraquinone dyes red-violet, 1.4-aminomethoxyanthraquinone+1.6-methoxychloroanthraquinone dyes Bordeaux, 1.4-aminomethoxyanthraquinone+1.6-methylaminochloroanthraquinone dyes violet, 1.8-dimethoxy-4-aminoanthraquinone+2-chloroanthraquinone dyes Bordeaux, 1.8-dimethoxy-4.5-diaminoanthraquinone+2 mol. 2-chloroanthraquinone dyes violet.

I claim:

1. The herein described new vat dyestuffs of the anthracene series which can be obtained from a para-aminoalkoxyanthraquinone and a halogen substituted anthraquinone, which dyestuffs are, after being dried and pulverized, colored powders practically insoluble in water and in the usual organic solvents, soluble in concentrated sulfuric acid with from a blue to green color; giving vats with hydrosulfite and caustic soda lye, which vats dye unmordanted cotton fast Bordeaux to violet shades, substantially as described.

2. The herein described new vat dyestuff of the anthracene series which can be obtained by condensing 1.4-methoxyaminoanthraquinone with 2-chloroanthraquinone, which dyestuff is, after being dried and pulverized, a dark powder which is practically insoluble in water and in the usual organic solvents; soluble in concentrated sulfuric acid with a greenish-blue color; giving a brown vat with hydrosulfite and caustic soda lye, which vat dyes cotton Bordeaux shades, substantially as described.

In testimony whereof I have hereunto set my hand in the presence of two subscribing witnesses.

HEINRICH RAEDER.

Witnesses:
OTTO KÖNIG,
CHAS. J. WRIGHT.